United States Patent
Seyed et al.

(10) Patent No.: US 11,838,991 B2
(45) Date of Patent: Dec. 5, 2023

(54) PEER-TO-PEER COMMUNICATION VIA SMART WEARABLES

(71) Applicant: Microsoft Technology Licensing, LLC, Redmond, WA (US)

(72) Inventors: Alemayehu Seyed, Mercer Island, WA (US); Stephen Edward Hodges, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 17/331,507

(22) Filed: May 26, 2021

(65) Prior Publication Data

US 2022/0386413 A1    Dec. 1, 2022

(51) Int. Cl.
*H04W 4/00* (2018.01)
*H04W 84/18* (2009.01)
*H04W 76/15* (2018.01)
*H04W 4/80* (2018.01)
*G06F 1/16* (2006.01)

(52) U.S. Cl.
CPC ............ *H04W 84/18* (2013.01); *G06F 1/163* (2013.01); *H04W 4/80* (2018.02); *H04W 76/15* (2018.02)

(58) Field of Classification Search
CPC ....... H04W 84/18; H04W 4/80; H04W 76/15; H04W 28/04; H04W 72/04; H04W 72/042; H04W 88/08; G06F 1/163; G06F 3/016; A41D 1/002; H04L 5/0007

See application file for complete search history.

(56) References Cited

U.S. PATENT DOCUMENTS

| | | | |
|---|---|---|---|
| 2009/0310290 A1* | 12/2009 | Tennent | G06F 1/163 701/469 |
| 2012/0250581 A1* | 10/2012 | Bilcu | H04W 84/18 370/254 |
| 2014/0070957 A1 | 3/2014 | Longinotti-Buitoni et al. | |
| 2014/0089513 A1* | 3/2014 | Adachi | H04W 76/10 709/227 |
| 2015/0227164 A1* | 8/2015 | Laycock | G06F 1/1652 345/82 |
| 2015/0241914 A1* | 8/2015 | Farjami | G06F 1/1656 361/679.03 |
| 2015/0289034 A1 | 10/2015 | Engman et al. | |

(Continued)

FOREIGN PATENT DOCUMENTS

| CN | 108966198 A | * | 12/2018 | ............. H04W 4/38 |
|---|---|---|---|---|
| WO | 2020041657 A1 | | 2/2020 | |

OTHER PUBLICATIONS

"International Search Report and Written Opinion Issued in PCT Application No. PCT/US22/027750", dated Jul. 22, 2022, 12 Pages.

*Primary Examiner* — Phuongchau Ba Nguyen
(74) *Attorney, Agent, or Firm* — WORKMAN NYDEGGER

(57) ABSTRACT

A smart wearable includes one or more sensors and one or more processors. The one or more sensors are configured to generate sensing data. The one or more processors are configured to process the sensing data and determine whether one or more predetermined conditions are satisfied based on the processing of the sensing data. In response to determining that the one or more predetermined conditions are satisfied, the smart wearable is caused to communicate with a second smart wearable.

20 Claims, 9 Drawing Sheets

(56) References Cited

U.S. PATENT DOCUMENTS

| | | | |
|---|---|---|---|
| 2016/0179066 A1* | 6/2016 | Chadwick | G06F 1/163 |
| | | | 700/83 |
| 2016/0367188 A1 | 12/2016 | Malik et al. | |
| 2017/0140644 A1* | 5/2017 | Hwang | G08C 17/02 |
| 2018/0241864 A1* | 8/2018 | Males | H04M 1/72454 |
| 2018/0314416 A1* | 11/2018 | Powderly | G06V 10/145 |
| 2019/0020971 A1* | 1/2019 | Ginsberg | B66B 1/3461 |

* cited by examiner

PEER-TO-PEER COMMUNICATION VIA SMART WEARABLES

BACKGROUND

Wearable technologies, smart wearables, smart wear, and/or skin electronics are smart electronic devices that are worn close to and/or on the surface of the skin, where they can detect, analyze, transmit, and/or display information, such as vital signs, and/or ambient data. Popular smart wearables include smartwatches and smart wrist bands. Generally, existing smart wearables do not allow different smart wearables to directly or indirectly communicate with each other, and the sensing data generated by each smart wearable is only presented to the owner of the wearable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to smart wearables configured to perform peer-to-peer communication with each other. The smart wearable includes one or more sensors configured to generate sensing data. The smart wearable is also configured to process the sensing data generated by the one or more sensors and determine whether one or more predetermined conditions are satisfied based on the processing of the sensing data. In response to determining that the one or more predetermined conditions are satisfied, the smart wearable is caused to communicate with a second smart wearable (that is worn by a second wearer).

In some embodiments, the one or more sensors include (but are not limited to) at least one of (1) a radio transceiver configured to detect radio generated by nearby devices, (2) a touch sensor configured to detect a touch input, (3) a radio-frequency identification (RFID) sensor configured to be triggered by an electromagnetic interrogation pulse from an RFID reader device, (4) a global positioning system (GPS) configured to identify a location of the smart wearable, (5) a global positioning system (GPS) configured to identify a location of the smart wearable, (6) a temperature sensor configured to detect a body temperature of a wearer or an ambient temperature, (7) a motion sensor, or (8) a heart rate sensor configured to detect a heart rate of a wearer.

In some embodiments, the smart wearable is further configured to detect a broadcast radio wave signal generated by a nearby smart wearable and communicate with the nearby smart wearable via radio.

In some embodiments, the smart wearable further includes one or more output devices configured to perform one or more actions in response to the communication between the smart wearable and the nearby smart wearable. The one or more output devices include at least one of (1) one or more LED lights, (2) one or more vibration devices, or (3) one or more sound generating devices.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments, which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
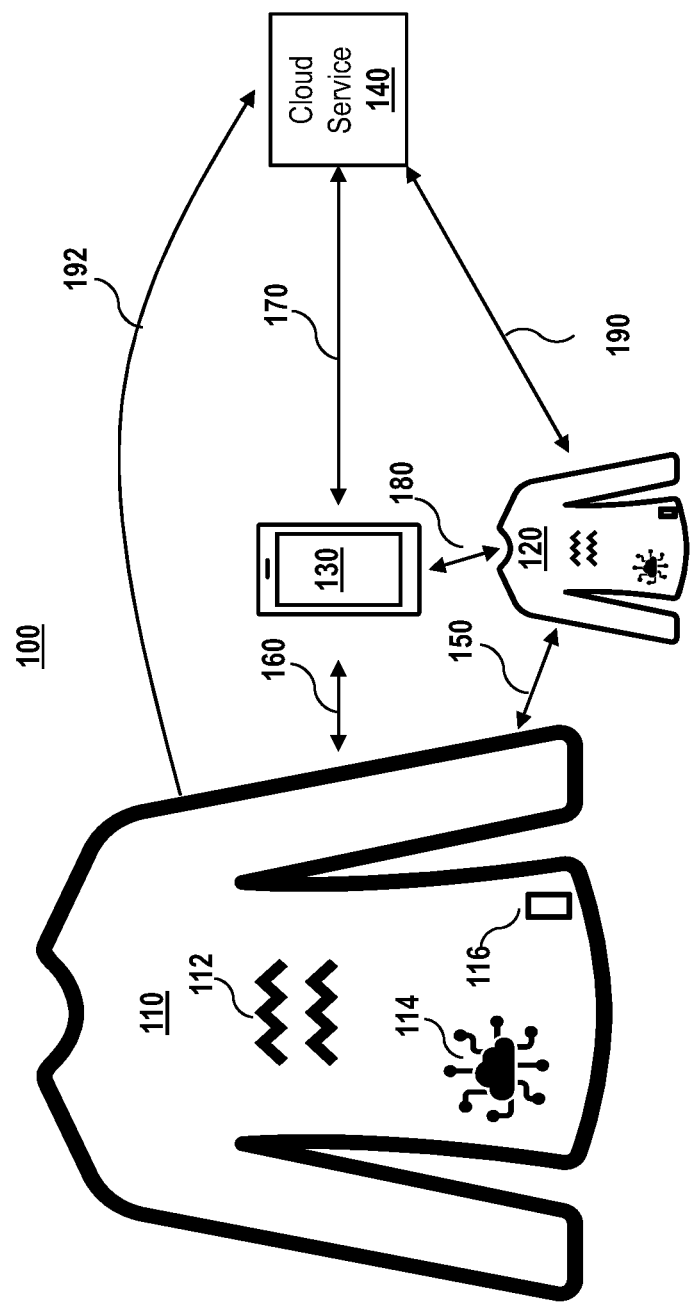
FIG. 1 illustrates an example of an environment in which one or more smart wearables are configured to perform peer-to-peer communication directly or indirectly via the mobile device and/or the cloud service.

The embodiments described herein are related to smart wearables configured to perform peer-to-peer communication with each other. The smart wearable includes one or more sensors configured to generate sensing data. The smart wearable also includes one or more processors configured to process the sensing data generated by the one or more sensors and determine whether one or more predetermined conditions are satisfied based on the processing of the sensing data. In response to determining that the one or more predetermined conditions are satisfied, the smart wearable is caused to communicate with a second smart wearable.

In some embodiments, the one or more sensors include (but are not limited to) at least one of (1) a radio transceiver configured to detect radio generated by nearby devices, (2) a touch sensor configured to detect a touch input, (3) a radio-frequency identification (RFID) sensor configured to be triggered by an electromagnetic interrogation pulse from an RFID reader device, (4) a global positioning system (GPS) configured to identify a location of the smart wearable, (5) a global positioning system (GPS) configured to identify a location of the smart wearable, (6) a temperature sensor configured to detect a body temperature of a wearer or an ambient temperature, (7) a motion sensor, or (8) a heart rate sensor configured to detect a heart rate of a wearer.

In some embodiments, the smart wearable includes a radio transceiver. The radio transceiver is configured to detect a broadcast radio wave signal generated by a nearby smart wearable. In response to detecting the broadcast radio wave signal generated by the nearby smart wearable, the smart wearable communicates with the nearby smart wearable via radio.

In some embodiments, the smart wearable further includes one or more output devices configured to perform one or more actions in response to the communication between the smart wearable and the nearby smart wearable. The one or more output devices include at least one of (1) one or more LED lights, (2) one or more vibration devices, or (3) one or more sound generating devices. In some embodiments, the one or more output devices include one or more LED lights. In some embodiments, the smart wearable is (1) a garment having a plurality of LED lights, or (2) an LED badge. In response to certain communication between the smart wearable and the nearby smart wearable, the one or more LED lights of the smart wearable are caused to light up.

In some embodiments, the smart wearable is associated with a particular social identity (e.g., a fan of a particular sports team) that a wearer is associated with. In some embodiments, the smart wearable is configured to communicate with the nearby smart wearable to determine whether the nearby smart wearable is also associated with the particular social identity. In response to determining that the nearby smart wearable is also associated with the particular social identity, the LED lights are caused to light up.

In some embodiments, the smart wearable is associated with a particular event in which a wearer is participating. The smart wearable is configured to communicate with the nearby smart wearable to determine whether the nearby smart wearable is also associated with the particular event. In response to determining that the nearby smart wearable is also associated with the particular event, the LED lights of the smart wearable are caused to light up.

In some embodiments, at least one of the one or more sensors is configured to determine that the smart wearable has entered an area associated with an event. In response to the determination, the radio transceiver is configured to start detecting broadcast radio generated by one or more nearby smart wearables. In response to detecting broadcast radio generated by a plurality of nearby smart wearables, the smart wearable and the plurality of nearby smart wearables form an ad hoc network. In some embodiments, the ad hoc network identifies a relative location of the smart wearable relative to the plurality of nearby smart wearables. In some embodiments, the ad hoc network causes the LED lights of the smart wearable and the plurality of nearby smart wearables to collectively create a light pattern. In some embodiments, the event is a sports event in a stadium. The smart wearable and the plurality of nearby smart wearables are associated with a sports team participating in the sports event. The LED lights of the smart wearable and the plurality of nearby smart wearables are caused to create a light pattern associated with the sports team.

FIG. 1 illustrates an example of an environment 100, in which a smart wearable 110 is configured to perform peer-to-peer communication with a nearby smart wearable 120 directly or indirectly via a mobile device 130 and/or a cloud service 140. In some embodiments, the smart wearable 110 is a smart shirt, such as (but not limited to) a sports team's jersey. The smart wearable 110 includes one or more output devices 112 (such as LED lights), one or more sensors 114, and a processing device 116. In some embodiments, processing device 116 is integrated into the smart wearable. In some embodiments, the processing device 116 is removably attached to a piece of smart garment (such as a smart shirt). The processing device 116 includes a communication device configured to communicate with other communication devices, such as a communication device of the nearby smart wearable 120.

As illustrated, in some embodiments, the smart wearable 110 (also referred to as a first smart wearable) is configured to communicate with a nearby smart wearable 120 (also referred to as a second smart wearable) via a first network 150. In some embodiments, the first smart wearable 110 is also configured to communicate with a mobile device 130 via a second network 160. In some embodiments, the mobile device 130 is further configured to communicate with a cloud service 140 via a third network 170. In some embodiments, the mobile device 130 is also configured to represent the first smart wearable 110 to communicate with the second smart wearable 120 via a fourth network 180. In some embodiments, the first smart wearable 110 and/or the second smart wearable 120 are also able to communicate with the cloud service 140 via a fifth network 190 or a sixth network 192. The fifth network 190 and the sixth network 192 may be a same or a different network. In some embodiments, the first smart wearable 110 and the second smart wearable 120 are configured to perform peer-to-peer communication via the cloud service 140.

In some embodiments, each of the first network 150, the second network 160, and/or the fourth network 180 is a personal area network or a local area network, such as (but not limited to) a Bluetooth low energy (BLE) network, a WiFi ad hoc network, or a WiFi network. In some embodiments, each of the third network 170, the fifth network 190, and the sixth network 192 is a local area network (e.g., a WiFi network) or a wide area network (e.g., a 2G, 3G, 4G, and/or 5G network).

Figure 2A:
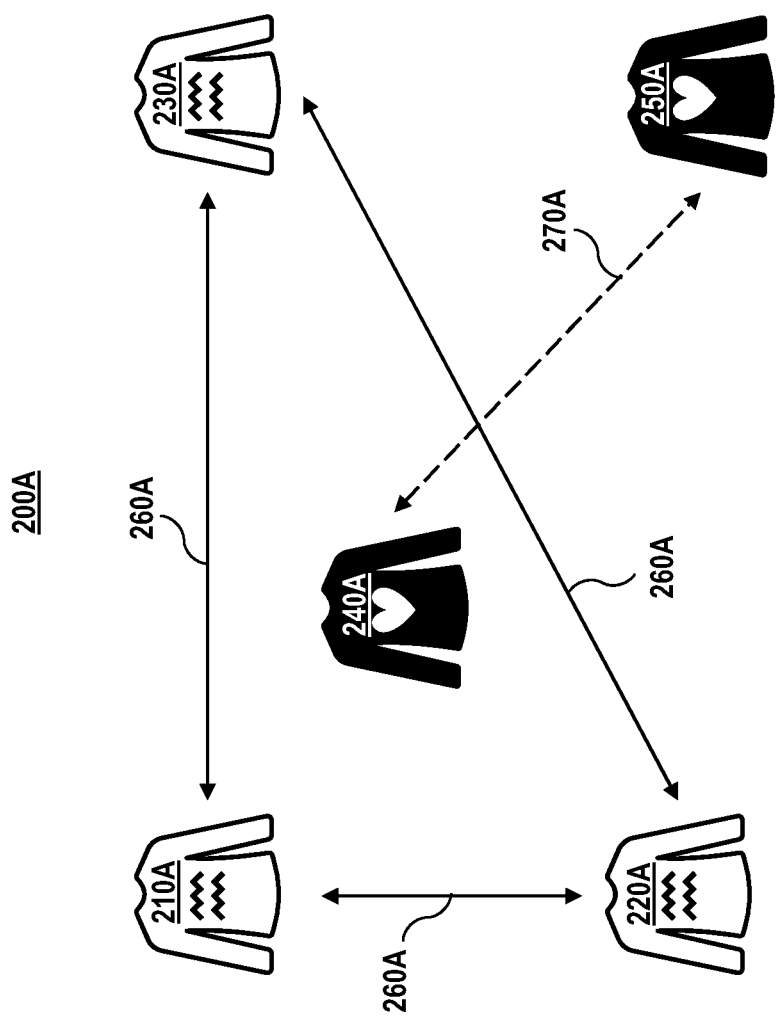
FIG. 2A illustrates an example of a system having a plurality of smart wearables configured to perform peer-to-peer communication directly.

FIG. 2A illustrates an example of a system 200A, in which a plurality of smart wearables 210A-250A is configured to perform peer-to-peer communication directly. Each of the smart wearables 210A-250A corresponds to the smart wearable 110 of FIG. 1. As illustrated, the smart wearables 210A, 220A, and 230A are configured to perform peer-to-peer communication among each other; and the smart wearables 240A and 250A are configured to perform peer-to-peer communication with each other. In some embodiments, whether a particular smart wearable is capable of establishing peer-to-peer communication with another smart wearable is determined based on user settings. In some embodiments, it is determined based on sensing data. For example, when a user sets the smart wearable to be associated with a particular social identity, such as a fan of a particular sports team, the smart wearable may be configured to directly communicate with another smart wearable that is associated with the same social identity (e.g., the same sports team).

For instance, in some embodiments, each of the smart wearables 210A-250A is a smart shirt having various LED lights. The smart wearables 210A, 220A, and 230A may be associated with a first sports team, and the smart wearables 240A and 250A may be associated with a second sports team. When the wearers of smart wearables 210A, 220A, and 230A are sufficiently close to each other, the LEDs on their smart shirts are configured to light up or flash in a particular pattern. Similarly, when the wearers of smart wearables 240A and 250A are sufficiently close to each other, the LEDs on their smart shirts are configured to light up or flash in a particular pattern. However, when a wearer of smart wearable 210A and a wearer of smart wearable 240A are close to each other, the smart wearables 210A and 240A may be configured to do nothing, since the two smart wearables 210A and 240A are associated with different sports teams.

In some embodiments, a plurality of related smart wearables 210A, 220A, and 230A may be configured to form an ad hoc network when certain conditions are satisfied. For example, when a geolocation sensor (e.g., a GPS) or an RFID sensor of the smart wearables 210A, 220A, and/or 230A determines that the corresponding smart wearable is located at or sufficiently close to a sports game (involving a first sports team), an ad hoc network 260A is established, such that the LED lights on the smart wearables may be coordinated to form a synchronized pattern associated with the first sports team. Similarly, when a geolocation sensor or an RFID sensor of the smart wearables 240A and 250A determines that the corresponding smart wearable is located at or sufficiently close to a sports game (involving a second sports team), an ad hoc network 270A is established, such that the LED lights on the smart wearables 240A-250A may be coordinated to form a synchronized pattern associated with the second sports teams. In some embodiments, when the first sports team and the second sports team are competing in a same sports game, the smart wearables 210A-230A associated with a first team are configured to form a first ad hoc network 260A, and the smart wearables 240A-250A associated with a second team are configured to form a second ad hoc network 270A.

Figure 2B:
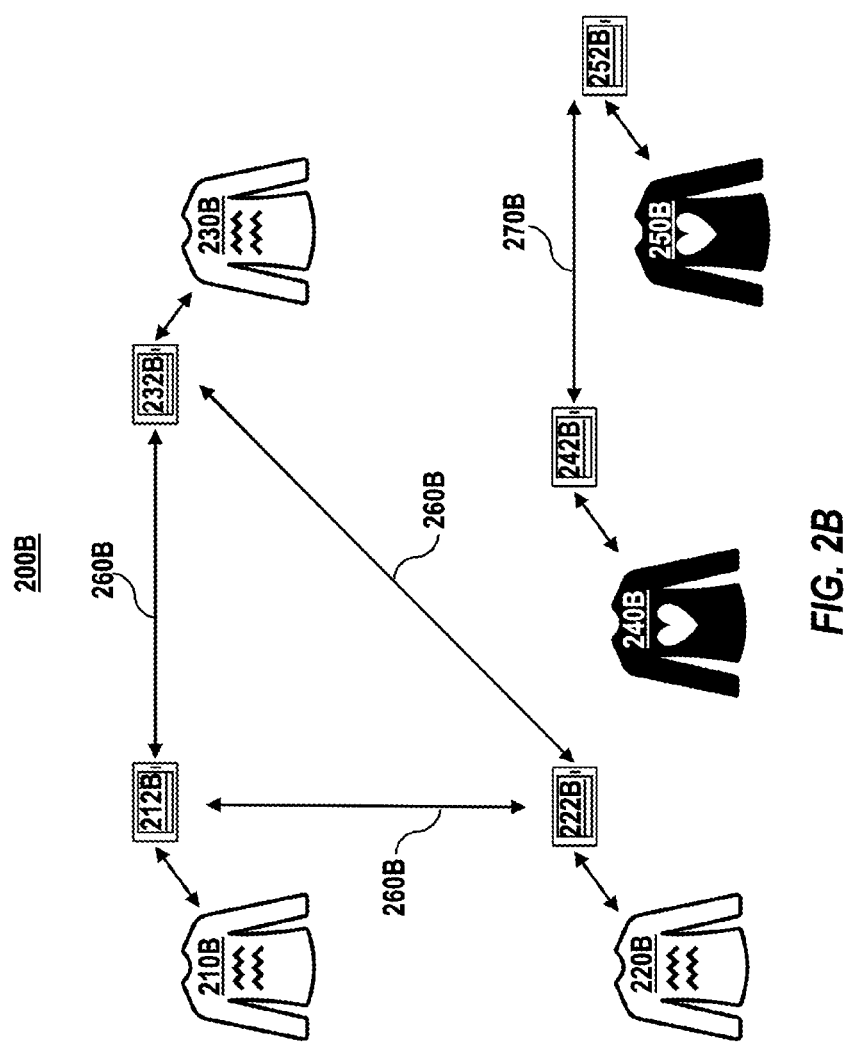
FIG. 2B illustrates an example of a system having a plurality of smart wearables, each of which is connected to a mobile device and configured to perform peer-to-peer communication indirectly via the mobile devices.

In some embodiments, the smart wearables are connected to mobile devices of their wearers, and peer-to-peer communications are performed via mobile devices. FIG. 2B illustrates an example of another system 200B in which a plurality of smart wearables 210B-250B is configured to communicate with each other via mobile devices 212B-252B. Each of the smart wearables 210B-250B also corresponds to the smart wearable 110 of FIG. 1. As illustrated, the smart wearable 210B is connected to a mobile device 212B, the smart wearable 220B is connected to a mobile device 222B, and the smart wearable 230B is connected to a mobile device 232B. The mobile devices 212B-232B are configured to communicate with each other, causing the output devices of the smart wearables 210B-230B to generate output. In some embodiments, each of the mobile devices 212B-232B has a mobile application installed thereon, and the mobile devices 212B-232B are connected to the smart wearables 210B-230B via the mobile application, and are also configured to communicate with the other mobile devices via the mobile application. Similarly, the smart wearables 240B and 250B are also connected to their corresponding mobile devices 242B and 252B. The mobile devices 242B and 252B are also configured to communicate with each other directly, representing the smart wearables 240B and 250B.

In some embodiments, when certain conditions are satisfied, a first ad hoc network 260B may be formed via the multiple mobile devices 212B-232B, allowing the smart wearables 210B-230B to perform peer-to-peer communication via the mobile devices 212B-232B indirectly. Similarly, a second ad hoc network 270B may be formed via the multiple mobile devices 242B-252B, allowing the smart wearables 242B-252B to perform peer-to-peer communication via the mobile devices 242B-252B.

FIGS. 2A and 2B merely illustrate two examples of systems in which the smart wearables are configured to perform peer-to-peer communication with each other directly or indirectly via mobile devices. As illustrated in FIG. 1, in some other embodiments, the smart wearables are also configured to communicate with a cloud service directly or indirectly via mobile devices, and the smart wearables are configured to communicate with each other via the cloud service. In such a case, the wearers of the smart wearables are not necessarily to be close to each other. They can be located in different parts of the world and still are able to communicate indirectly with each other peer-to-peer. The methods of peer-to-peer communication depend on the hardware and software embodiments of the smart wearables and mobile applications.

Figure 3:
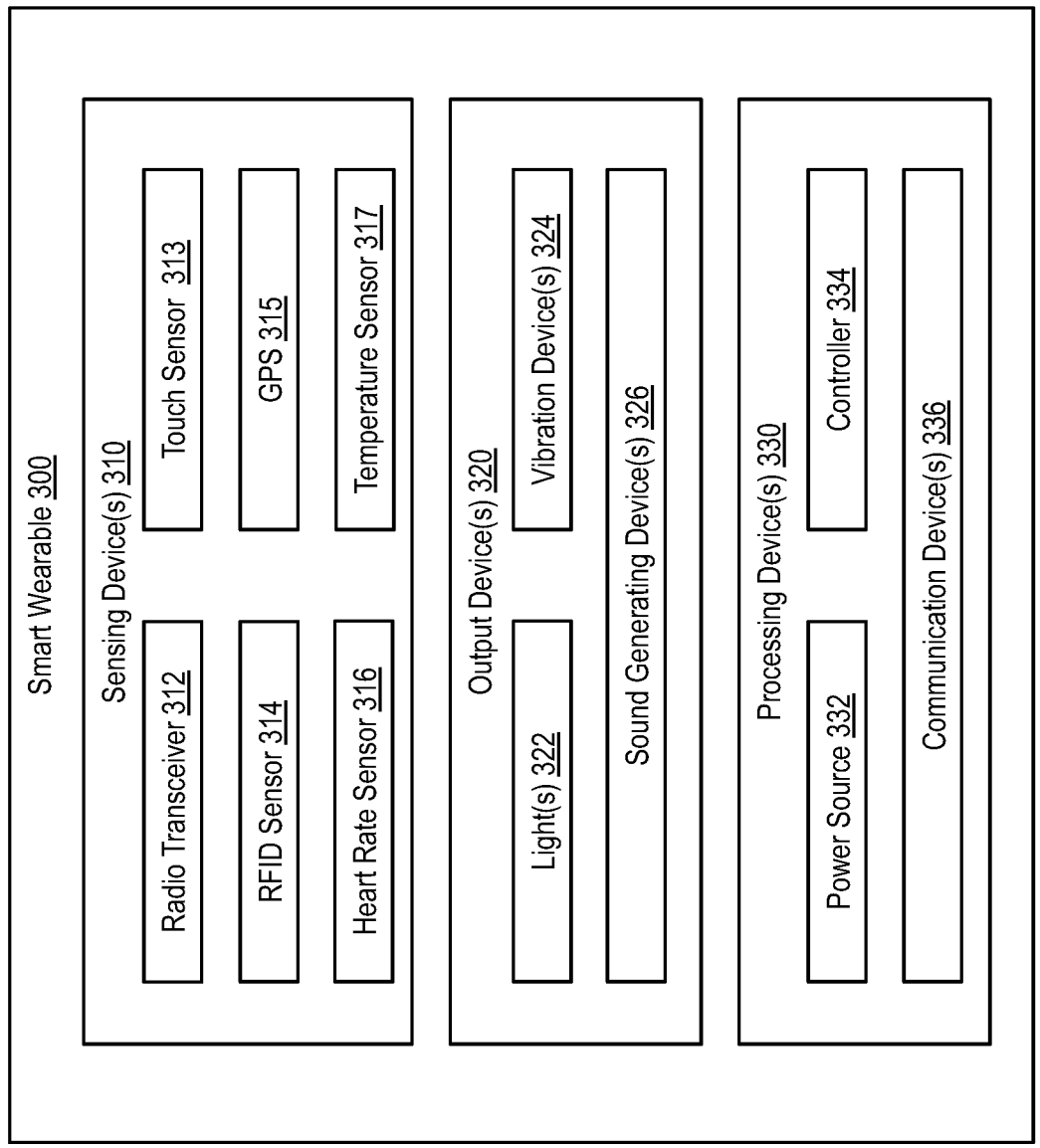
FIG. 3 illustrates an example of an architecture of a smart wearable.

FIG. 3 illustrates an example of an architecture of a smart wearable 300, including one or more sensing device(s) 310, one or more output devices 320, and/or one or more processing device(s) 330. In some embodiments, the one or more sensing device(s) 310 includes at least one of (1) radio transceiver 312, (2) a touch sensor 313, (3) an RFID sensor 314, (4) a GPS 315, (5) a heart rate sensor 316, and/or (6) a temperature sensor 317. The radio transceiver 312 is configured to detect radio generated by other devices, including (but not limited to) a mobile device and/or another smart wearable. Such radio include (but are not limited to) Bluetooth low energy signals and/or WiFi signals.

The touch sensor 313 is configured to receive a touch input, which may be generated by a wearer, by a nearby entity, and/or by an object. The RFID sensor 314 is configured to be triggered by an electromagnetic interrogation pulse from an RFID reader device. The GPS 315 is configured to identify the location of the smart wearable. The temperature sensor 317 is configured to detect a body temperature of a wearer or an ambient temperature. The heart rate sensor 316 is configured to detect a heart rate of a wearer. Notably, in some embodiments, additional sensors, such as (but not limited to) a motion sensor, gyroscopes, are also included in the smart wearable.

In some embodiments, the output device(s) 320 includes at least one of (1) one or more lights (e.g., LED lights) 322, (2) one or more vibration device(s) 324, and/or (3) one or more sound generating devices (e.g., speaker) 326. In some embodiments, the one or more lights 322 include an LED lights array that is configured to light up at different colors and/or different patterns. In some embodiments, the one or more vibration devices 324 are configured to generate a notification to the wearer. In some embodiments, the one or more vibration devices include an array of vibration devices configured to vibrate at a particular pattern, creating a particular sensation. In some embodiments, the sound generating devices 326 are one or more speakers configured to play a notification sound, and/or a particular audio score, including (but not limited to) a song, a piece of music, a natural sound (e.g., water sound, applause sound), etc.

The processing device 330 includes a power source 332, a controller 334, and/or one or more communication devices 336. The power source 332 is configured to provide power to the sensing devices 310, the output devices 320, the controller 334, and the communication devices 336. In some embodiments, the power source 332 is a rechargeable battery or a disposable battery. In some embodiments, the power source 332 is a solar panel configured to convert light into power. In some embodiments, the communication devices 336 are configured to communicate with a mobile device of the wearer, a nearby smart wearable, and/or a cloud service. In some embodiments, the controller is configured to process the sensing data received from the sensing devices 310 and cause the communication devices 336 to transmit the processed data to a mobile device or a nearby smart wearable.

In some embodiments, the processing devices 330 is a separate component that is removably attached to the smart wearable. For example, when the smart wearable is a smart garment (e.g., a shirt), the processing devices 330 may be a dongle configured to be removably attached to the smart garment. In some embodiments, the processing devices 330 are integrated with the sensing devices 310 and the output devices 320. For example, when the smart wearable is an LED badge, the processing device 330 may be integrated with the LED badge.

In some embodiments, the smart wearable 300 is a smart shirt (e.g., a sports team jersey) having a plurality of LED lights attached thereon. The communication device 336 is configured to send a broadcast signal containing information associated with the smart wearable 300 or the wearer. The communication device 336 is also configured to scan the nearby area to identify broadcast signals sent by other nearby smart wearables. In response to identifying a broadcast signal sent by another smart wearable, the communication device 336 obtains the information contained in the broadcast signal to determine whether the smart wearable satisfies one or more conditions.

In some embodiments, the one or more conditions may be set by the manufacture of the smart wearable and/or the wearer. For example, when the smart shirt 300 is a particular sports team's jersey, the smart shirt 300 may be set to turn on the LED lights when another nearby jersey (associated with the same sports team) is identified. As another example, the smart shirt 300 may be a generic smart shirt including a programmable LED array that a wearer may be allowed to program any light patterns to be performed by the LED array. The wearer may also be allowed to set their own conditions about when a particular light pattern is to be performed. For example, in some embodiments, when a particular sports team fan nearby is detected, a first light pattern is performed; and when an alumnus of a particular school nearby is detected, a second light pattern is performed.

In some embodiments, the peer-to-peer communication is triggered in response to certain sensing data being generated by the sensing devices 310. For example, in some embodiments, one of the sensing devices 310 is an RFID sensor 316. When the wearer enters a stadium of a particular sports event, the RFID sensor 316 is triggered by an electromagnetic interrogation pulse from a nearby RFID reader device. The RFID reader device sends its identifier in the electromagnetic interrogation pulse. In this case, the identifier may identify that the RFID reader device is associated with the particular sports event. In response to the triggering by the particular RFID reader device, the smart wearable 300 determines that the wearer is currently in the stadium of the particular sports event and causes the communication devices 336 and/or the radio transceiver 312 to start searching nearby smart wearables.

Figure 4:
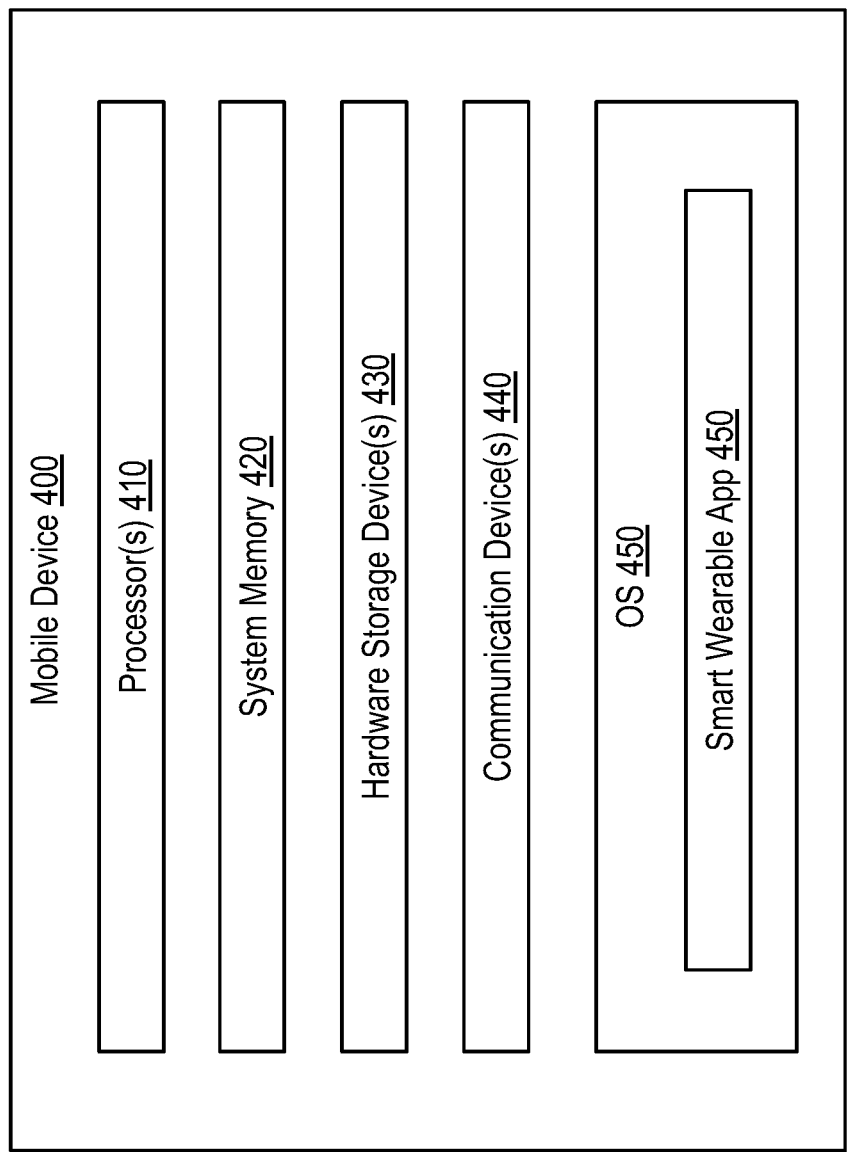
FIG. 4 illustrates an example of a mobile device configured to interface with a smart wearable.

As briefly discussed above, in some embodiments, the smart wearable 300 is configured to be connected to another computing device (e.g., a mobile device). FIG. 4 illustrates an example of an architecture of a mobile device 400 (which corresponds to the mobile device 130 of FIG. 1, and/or mobile device 212B-252B) configured to be connected to a smart wearable 300 of FIG. 3. The mobile device 400 may be a mobile phone of a wearer of the smart wearable 300. The mobile device 400 includes one or more processors 410, one or more system memories 420, one or more hardware storage devices 430, and one or more communication devices 440.

In some embodiments, an operating system (OS) 450 is stored in the one or more hardware storage devices 430 and loaded into the system memory 420. In some embodiments, one or more applications are also stored in the one or more hardware storage devices 430 and loaded into the system memory 420. In some embodiments, the one or more applications includes a smart wearable application 450 configured to allow the mobile device 400 to be connected to the smart wearable 400 and to receive data generated by the sensing devices 310 and/or cause the one or more output devices 320 to generate feedback actions, such as (but not limited to) turning the LED lights 322 on, causing the vibration devices 324 to vibrate, and/or causing the sound generating devices 326 to play a sound.

In some embodiments, the smart wearable app 450 allows the wearer to set one or more conditions associated with the smart wearable that is connected thereto. For example, in some embodiments, the smart wearable app 450 allows a wearer to set (1) a particular social identity (e.g., a fan of a sports team) and/or (2) a participant of a particular social event (e.g., a particular sports event, a reunion, a conference).

In some embodiments, the mobile device 400 is further configured to perform peer-to-peer communication for the smart wearable 300 that is connected thereto. For example, when the mobile device 400 associated with a smart wearable 300 identifies a nearby mobile device that is associated with another smart wearable, the two mobile devices may be configured to determine whether their associated smart wearables are to be configured to perform one or more collaborated actions, such as (but not limited to) lighting up the LED lights, generating a particular sound, and/or vibrating in a particular pattern.

In some embodiments, the smart wearable app 450 further allows smart wearables located remotely to perform actions in response to certain conditions and based on certain personal relationships. For example, two wearers may be good friends and also both fans of a particular sports team. The two friends may be watching that particular sports team's game at their own homes wearing the smart wearable 300. When the team scores, both of the smart wearables may be configured to vibrate in a particular pattern and/or generate a particular sound. In some embodiments, one wearer's vibration pattern or sound may be set by another wearer. Alternatively, the vibration pattern or sound may be jointly agreed upon by both wearers.

In some embodiments, all the smart wearables that are associated with a same group (e.g., a same sports team) located nearby within a particular area are configured to form an ad hoc network. The ad hoc network can be used to coordinate feedback actions of all the smart wearables. For example, when the sports team scores, the ad hoc network may cause LEDs of all the smart wearables to light up. In some embodiments, the ad hoc network is also configured to identify relative locations of the multiple smart wearables and/or mobile devices at the event. The multiple smart wearables may be caused to generate a large light pattern forming a logo or a letter representing the sports team.

Figure 5:
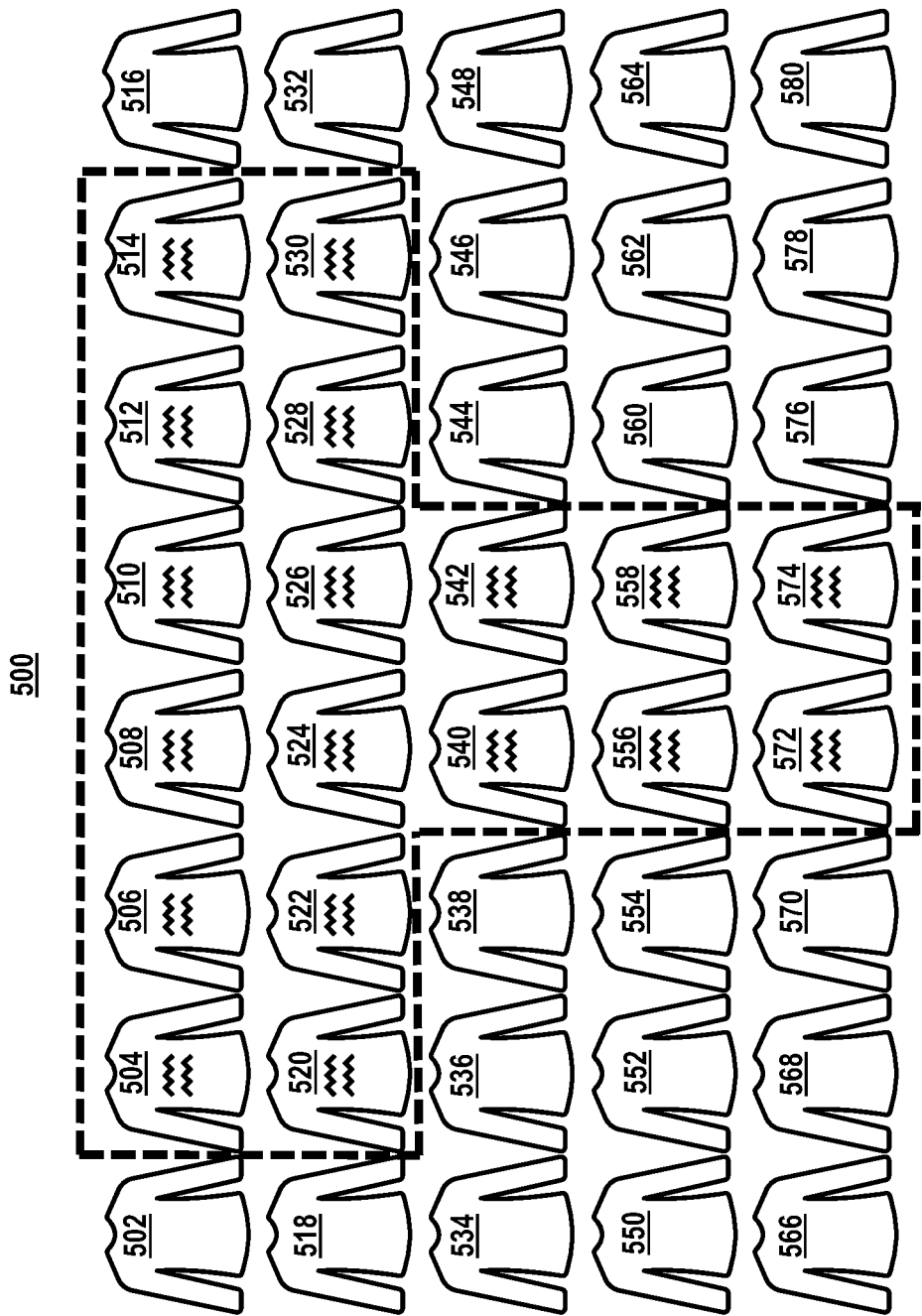
FIG. 5 illustrates an example of an environment at a large event, during which a plurality of smart wearables are configured to form an ad hoc network for collectively generating light patterns associated with a particular group or team of the event.

FIG. 5 illustrates an example of an environment 500, in which many wearers of smart wearables 502-580 are sitting at multiple rows of seats in a stadium. The multiple smart wearables are configured to form an ad hoc network, identifying their relative locations in the stadium. In some embodiments, the ad hoc network is configured to cause LED lights of certain smart wearables to light up to form a particular pattern. As illustrated, the LED lights of smart wearables 504-514, 520-530, 540, 542, 556, 558, 572, and 574 are caused to light up to form a large T pattern. In some embodiments, a particular light pattern is triggered in response to a particular circumstance, such as when the sports team scores or wins.

In some embodiments, the smart wearable 300 can also be used to help to organize other social events. For example, in a large group event, such as (but not limited to) a large family reunion, a wedding, a group outing, a conference, participants do not necessarily know each other very well. Each participant can wear a smart wearable that is set to identify the wearer as a participant of the event. When one wearer of a smart wearable belonging to a group is sufficiently close to another wearer of a smart wearable belonging to the same group, both of their smart wearables may be configured to generate feedback signals, such as turning on the LED lights in a particular pattern.

Further, in addition to sensing geolocation and/or nearby smart wearables, in some embodiments, the smart wearable 300 is also configured to initiate communication in response to other sensing data. For example, when the touch sensor 313 or a motion sensor detects a fall of the wearer, the smart wearable 300 may be configured to actively communicate with nearby smart wearables. In some embodiments, the smart wearable 300 may be configured to search a nearby smart wearable that is associated with a medical professional, and in response to finding a nearby smart wearable that is associated with a medical professional, the smart wearable 300 sends a notification to the nearby smart wearable associated with the medical professional. Additionally or alternatively, the smart wearable 300 may also cause the LED lights to light up in response to detecting a fall of the wearer.

Similarly, the smart wearable may also be configured to initiate communication in response to detecting a body temperature greater than a predetermined threshold or a heartbeat greater or lower than a predetermined threshold. For example, in a community sports event, such as a marathon, 5K, 10K running event, each of the participants may be required to wear a smart wearable having multiple sensors configured to detect a participant's fall, a body temperature, and/or a heart rate of the participant. In response to detecting anomalies associated with the body motion, the body temperature and/or heart rate, the smart wearable is configured to send a message to a smart wearable of a nearby participant or a nearby assistant, such that the wearer of the smart wearable can be helped by the nearby people who are also wearing a smart wearable.

Although the descriptions above are primarily related to allowing a smart wearable to directly communicate with another nearby smart wearable or indirectly communicate with another nearby smart wearable via mobile devices, the present invention is not limited to these embodiments. In some embodiments, the smart wearable 300 is configured to be connected to be a computing system. In some embodiments, the wearer of a smart wearable is configured to play a computer game at the computing system. The smart wearables are configured to generate one or more actions based on the wearer's actions and the other players' actions in the game. For example, in some cases, the vibration devices 324 are configured to vibrate when a bomb blows up in the game. As another example, in some cases, the sound generating devices 326 are configured to generate various sound effects based on the events happening in the game.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
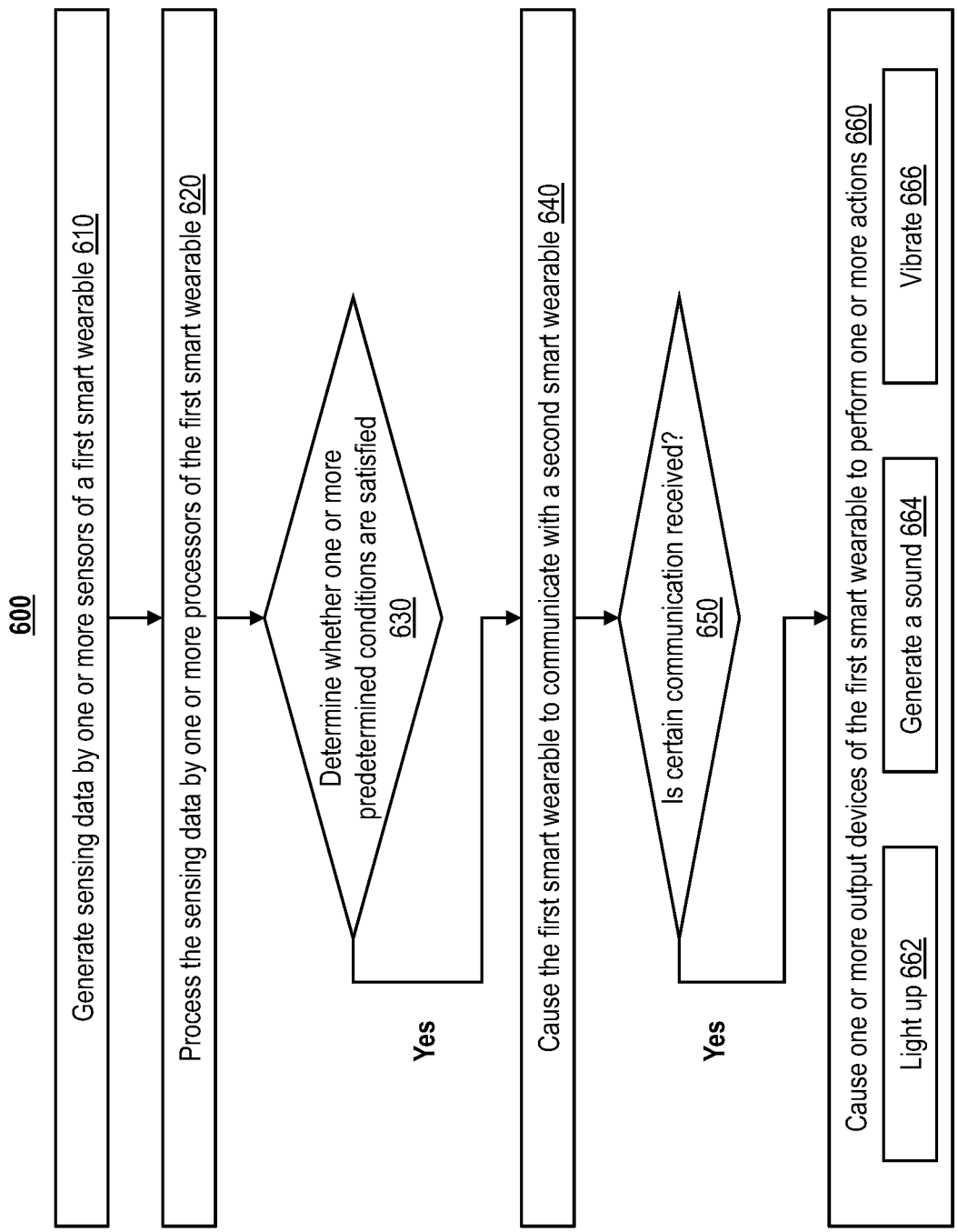
FIG. 6 illustrates a flowchart of an example method for performing peer-to-peer communication by a smart wearable.

FIG. 6 illustrates a flowchart of an example method 600 implemented at a first smart wearable for performing peer-to-peer communication with a second smart wearable. Each of the first smart wearable or the second smart wearable corresponds to the smart wearable of 110 of FIG. 1 and/or 300 of FIG. 3. Each of the first smart wearable or the second smart wearable includes one or more sensing devices, one or more output devices, and one or more processing devices. The method 600 includes generating sensing data by one or more sensors of a first smart wearable (act 610). The method 600 also includes processing the sensing data by one or more processing devices of the first smart wearable (act 620). Based on the processing of the sensing data, the first smart wearable determines whether one or more predetermined conditions are satisfied (act 630). For example, in some embodiments, the sensing data is generated by an RFID sensor configured to detect whether the smart wearable has entered into an event (e.g., a sports game at a particular stadium). The one or more predetermined conditions may be that a favorite team of the wearer is playing at the sports event.

In response to determining that one or more predetermined conditions are satisfied, the first smart wearable is caused to communicate with a second smart wearable (act 640). The processing devices of the first smart wearable are also configured to determine whether certain communication is received (act 650). In response to determining that certain communication is received, the one or more output devices of the first smart wearable are caused to perform one or more actions (act 660). In some embodiments, the one or more actions (act 660) include (but not limited to) (1) lighting up one or more LED lights of the first smart wearable (act 662), (2) generating a sound by one or more sound generating devices of the first smart wearable (act 664), and/or (3) vibrating one or more vibration devices of the first smart wearable (act 666). For example, when the first smart wearable determines that the second smart wearable is also associated with the favorite team of the first smart wearable, the LED lights of the first smart wearable are caused to light up.

Notably, the same method 600 may also be performed at the second smart wearable, such that both the first wearable and the second smart wearable are configured to perform similar actions in response to the communication between the first smart wearable and the second wearable. For example, when the first smart wearable and the second smart wearable are both associated with the same sports team, the LED lights of both the first smart wearable and the second smart wearable may be caused to light up simultaneously.

Figure 7:
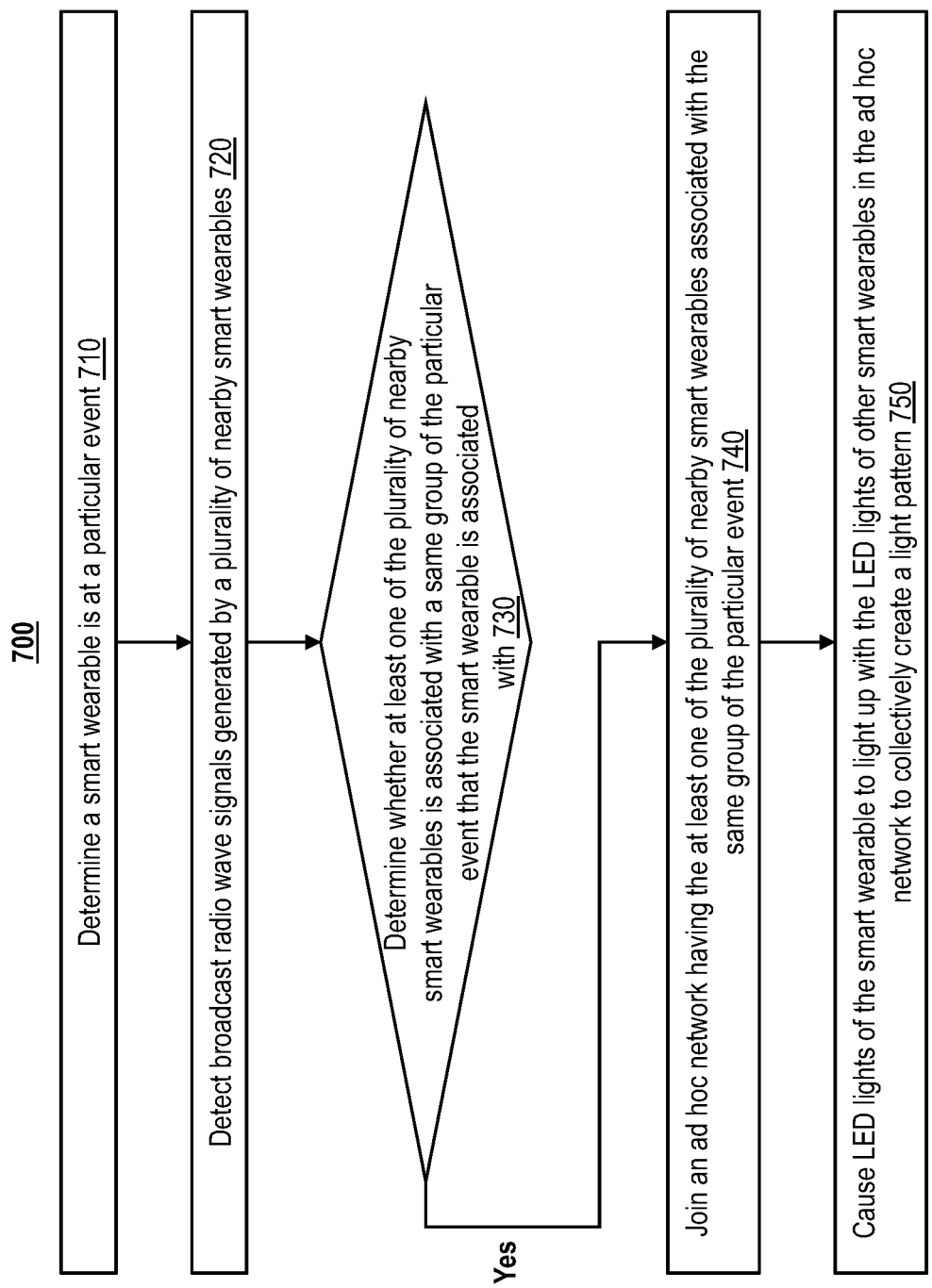
FIG. 7 illustrates a flowchart of an example method for joining an ad hoc network including a plurality of smart wearables.

FIG. 7 illustrates a flowchart of an example method 700 implemented at a smart wearable (which corresponds to the smart wearable 110 of FIG. 1 and/or the smart wearable 300 of FIG. 3) for joining an ad hoc network including a plurality of nearby wearable for peer-to-peer communication. The method 700 includes determining that the smart wearable is at a particular event (act 710). In response to determining that the smart wearable is at the particular event, the smart wearable starts detecting broadcast radio generated by a plurality of nearby smart wearables (act 720). The method 700 further includes determining whether at least one of the plurality of nearby smart wearables is associated with a same group of the particular event that the smart wearable is associated with (act 730). For example, when the smart wearable is associated with a particular team playing in the particular event, the smart wearable determines whether at least one of the plurality of nearby smart wearables is associated with the same team.

In response to determining that at least one of the plurality of nearby smart wearables is associated with the same group of the particular event that the smart wearable is associated with, the smart wearable is configured to join an ad hoc network having the at least one of the plurality of nearby smart wearable associated with the same group of the particular event (act 740) and cause the LED lights of the smart wearable to light up with the LED lights of other smart wearables in the ad hoc network to collectively create a light pattern (act 750).

Finally, because the principles described herein may be performed in the context of a computing system (for example, each of the smart wearable 110, 210A-250A, 210B-250B, 300, and the mobile device 400 may include one or more computing systems) some introductory discussion of a computing system will be described with respect to FIG. 8.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
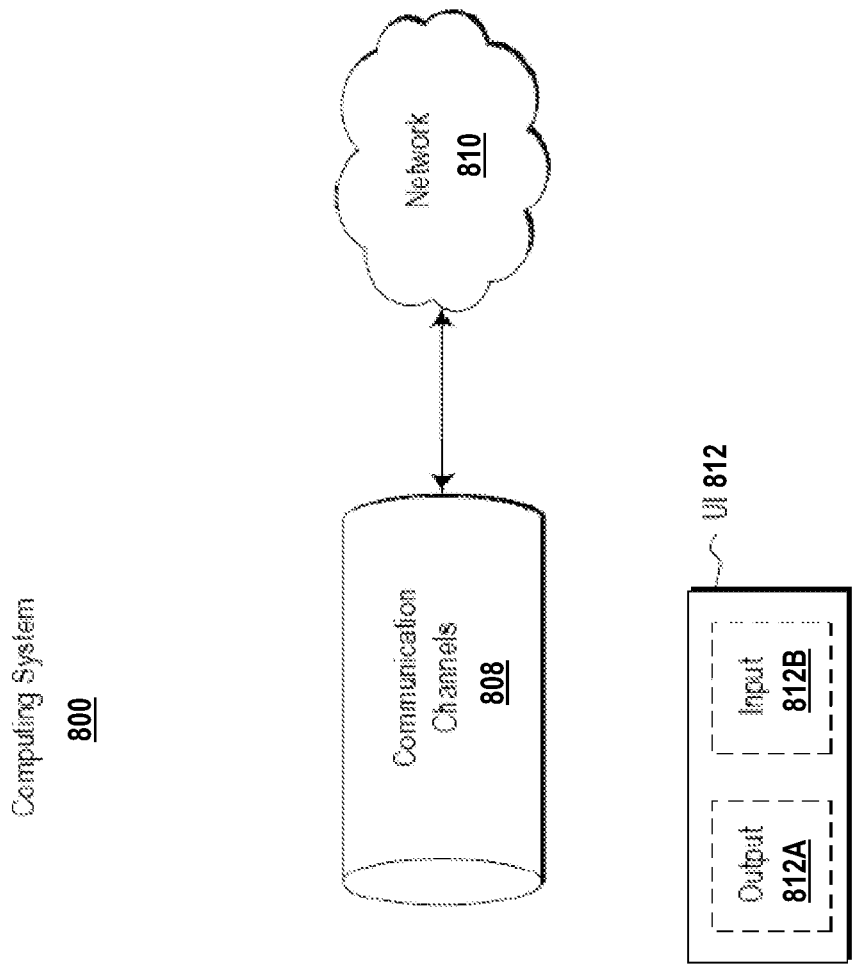
FIG. 8 illustrates an example computing system in which the principles described herein may be employed.
Figure 8:
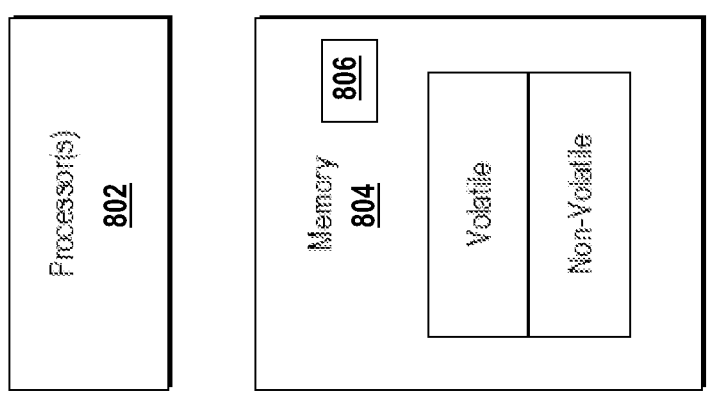

As illustrated in FIG. 8, in its most basic configuration, a computing system 800 typically includes at least one processing unit 802 and memory 804. The processing unit 802 may include a general-purpose processor and may also include a field-programmable gate array (FPGA), an application-specific integrated circuit (ASIC), or any other specialized circuit. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 also has thereon multiple structures often referred to as an "executable component". For instance, memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms and so forth. Examples of input mechanisms 812B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then eventually transferred to computing system RANI and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 800 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processing unit 802 and memory 804, as needed to perform their various functions.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A smart wearable computing device comprising:
   a sensor configured to generate sensing data;
   a radio transceiver;
   a processor; and
   a computer-readable hardware storage device having stored thereon computer-executable instructions that are structured such that, when the computer-executable instructions are executed by the processor, the computer-executable instructions cause the smart wearable computing device to at least:
   generate sensing data by the sensor;
   process the sensing data generated by the sensor;
   determine that a predetermined condition is satisfied based on processing of the sensing data, the predetermined condition including that the smart wearable computing device has entered an area associated with an event; and
   in response to determining that the predetermined condition is satisfied, cause the smart wearable computing device to communicate with plurality of other smart wearable computing devices, including:
      detecting, by the radio transceiver, a broadcast radio wave signal generated by an other smart wearable computing device; and
      in response to detecting the broadcast radio wave signal generated by the other smart wearable computing device, form an ad hoc network with the plurality of other smart wearable computing devices.

2. The smart wearable computing device of claim 1, wherein:
   the sensor includes at least one of (1) a touch sensor configured to detect a touch input, (2) a radio-frequency identification (RFID) sensor configured to be triggered by an electromagnetic interrogation pulse from a RFID reader device, (3) a global positioning system (GPS) configured to identify a location of the smart wearable computing device, (4) a temperature sensor configured to detect a body temperature of a wearer or an ambient temperature, (5) a heart rate sensor configured to detect a heart rate of the wearer, or (6) a motion sensor.

3. The smart wearable computing device of claim 1, further comprising an output device configured to perform one or more actions in response to a communication between the smart wearable computing device and the other smart wearable computing device,
   wherein the output device includes at least one of (1) an LED light, (2) a vibration device, or (3) a sound generating device.

4. The smart wearable computing device of claim 3, wherein:
   the output device includes the LED light; and
   in response to the communication between the smart wearable computing device and the other smart wearable computing device, the LED light is caused to light up.

5. The smart wearable computing device of claim 4, wherein the smart wearable computing device is (1) a piece of garment having a plurality of LED lights or (2) an LED badge.

6. The smart wearable computing device of claim 4, wherein:
   the smart wearable computing device is associated with a particular social identity that a wearer is associated with;
   the smart wearable computing device is configured to communicate with the other smart wearable computing device to determine whether the other smart wearable computing device is also associated with the particular social identity; and
   in response to determining that the other smart wearable computing device is also associated with the particular social identity, the LED light is caused to light up.

7. The smart wearable computing device of claim 4, wherein:
   the smart wearable computing device is associated with a particular social event that a wearer is participating in;
   the smart wearable computing device is configured to communicate with the other smart wearable computing device to determine whether the other smart wearable computing device is also associated with the particular social event; and
   in response to determining that the other smart wearable computing device is also associated with the particular social event, the LED light is caused to light up.

8. The smart wearable computing device of claim 1, wherein the ad hoc network identifies a relative location of the smart wearable computing device relative to the plurality of other smart wearable computing devices.

9. The smart wearable computing device of claim 8, wherein the ad hoc network causes LED lights of the smart wearable computing device and of the plurality of other smart wearable computing devices to collectively create a light pattern.

10. The smart wearable computing device of claim 8, wherein:
    the event is a sports event in a stadium;
    the smart wearable computing device and the plurality of other smart wearable computing devices are associated with a sports team participating in the sports event; and
    LED lights of the smart wearable computing device and of the plurality of other smart wearable computing devices are caused to create a light pattern associated with the sports team.

11. A computing system comprising:
    a processor; and
    a computer-readable hardware storage device having stored thereon computer-executable instructions that are structured such that, when the computer-executable instructions are executed by the processor, the computer-executable instructions cause the computing system to at least:
    connect to a first smart wearable computing device having an LED light;
    communicate with a second computing system connected to a second smart wearable computing device;
    determine that a predetermined condition is satisfied based on communicating with the second computing system, including determining that the first smart wearable computing device and the second smart wearable computing device are associated with a same social identity; and in response to determining that the predetermined condition is satisfied, cause the LED light of the first smart wearable computing device to light up.

12. The computing system of claim 11, wherein:
in response to determining that the first smart wearable computing device and the second smart wearable computing device are associated with the same social identity, the computing system and a plurality of second computing systems, each of which is associated with one of a plurality of second smart wearable computing devices, form an ad hoc network.

13. The computing system of claim 11, wherein:
the first smart wearable computing device further comprises a sensor configured to generate sensing data;
the sensor includes at least one of (1) a radio transceiver configured to detect radio signals generated by nearby devices, (2) a touch sensor configured to detect a touch input, (3) a radio-frequency identification (RFID) sensor configured to be triggered by an electromagnetic interrogation pulse from an RFID reader device, (4) a global positioning system (GPS) configured to identify a location of the first smart wearable computing device, (5) a temperature sensor configured to detect a body temperature of a wearer or an ambient temperature, or (6) a heart rate sensor configured to detect a heart rate of the wearer; and
the computer-executable instructions further cause the computing system to receive and process sensing data generated by the sensor.

14. The computing system of claim 13, wherein the computer-executable instructions further cause the computing system to communicate with the second computing system connected to the second smart wearable computing device when certain sensing data is received.

15. A computer program product comprising one or more hardware storage devices having stored thereon computer-executable instructions that are structured such that, when the computer-executable instructions are executed by a processor of a computing system, the computer-executable instructions cause the computing system to at least:
connect to a first smart wearable computing device having a sensor and an output device;
communicate with a second computing system connected to a second smart wearable computing device;
determine whether a predetermined condition is satisfied based on communicating with the second computing system, including determining that the first smart wearable computing device and the second smart wearable computing device are associated with a same social identity; and
in response to determining that the predetermined condition is satisfied, form an ad hoc network with a plurality of computing systems, each of which is associated with one of a plurality of smart wearable computing devices.

16. The computer program product of claim 15, wherein:
the sensor includes at least one of (1) a radio transceiver configured to detect radio signals generated by nearby devices, (2) a touch sensor configured to detect a touch input, (3) a radio-frequency identification (RFID) sensor configured to be triggered by an electromagnetic interrogation pulse from an RFID reader device, (4) a global positioning system (GPS) configured to identify a location of the first smart wearable computing device, (5) a temperature sensor configured to detect a body temperature of a wearer or an ambient temperature, or (6) a heart rate sensor configured to detect a heart rate of the wearer; and
the computer-executable instructions further cause the computing system to receive and process sensing data generated by the sensor.

17. The computer program product of claim 16, wherein the computer-executable instructions further cause the computing system to communicate with the second computing system connected to the second smart wearable computing device when certain sensing data is received.

18. The computer program product of claim 16, wherein determining that the predetermined condition is satisfied includes determining that the first smart wearable computing device has entered an area associated with an event.

19. The computer program product of claim 16, wherein:
the output device at the first smart wearable computing device comprises an LED light; and
the computer-executable instructions further cause the computing system to, in response to determining that the predetermined condition is satisfied, cause the LED light at the first smart wearable computing device to light up.

20. The computer program product of claim 19, wherein the ad hoc network causes the LED light at the first smart wearable computing device and LED lights of the plurality of smart wearable computing devices to collectively create a light pattern.

* * * * *